United States Patent
McCuskey et al.

(10) Patent No.: US 7,165,750 B2
(45) Date of Patent: Jan. 23, 2007

(54) WEAPON CADDY

(76) Inventors: Scott A. McCuskey, 164 Ballpark Rd., Sharpsville, PA (US) 16150; Shane C. McCuskey, 435 Butterfly La., Hermitage, PA (US) 16148

( * ) Notice: Subject to any disclaimer, the term of this patent is extended or adjusted under 35 U.S.C. 154(b) by 0 days.

(21) Appl. No.: 10/723,487

(22) Filed: Nov. 26, 2003

(65) Prior Publication Data

US 2005/0109891 A1 May 26, 2005

(51) Int. Cl.
*A47B 96/00* (2006.01)
(52) U.S. Cl. .................. 248/214; 248/285.1; 248/286.1
(58) Field of Classification Search .......... 248/229.17, 248/228.8, 230.8, 218.4, 219.4, 354.3, 354.4, 248/285.1, 286.1; 224/401, 412, 413, 420, 224/448, 913; 182/187; 42/94; 89/37.04; 211/64, 60.1; D22/108, 199, 100
See application file for complete search history.

(56) References Cited

U.S. PATENT DOCUMENTS

| | | | | |
|---|---|---|---|---|
| 167,169 | A * | 8/1875 | Hare | 42/94 |
| 879,052 | A * | 2/1908 | Jeranek | 89/40.06 |
| 908,751 | A * | 1/1909 | Cooke | 248/224.8 |
| 2,692,069 | A * | 10/1954 | Winters | |
| 2,870,683 | A | 1/1959 | Wilson | |
| 3,225,656 | A * | 12/1965 | Flaherty | |
| 3,494,582 | A * | 2/1970 | Nemeth | 211/107 |
| 4,017,997 | A * | 4/1977 | Peterson | 41/94 |
| 4,140,296 | A * | 2/1979 | Guzman Guillen | 248/445 |
| 4,150,733 | A * | 4/1979 | Plummer | 182/187 |
| 4,230,296 | A | 10/1980 | Staley et al. | |
| 4,575,964 | A * | 3/1986 | Griffin | 42/94 |
| 4,913,391 | A | 4/1990 | Klipp | |
| 4,937,965 | A | 7/1990 | Narvaez | |
| 4,967,497 | A | 11/1990 | Yakscoe | |
| 5,044,590 | A * | 9/1991 | Carafice | 248/309.1 |
| 5,078,279 | A * | 1/1992 | Hancock | 211/64 |
| 5,347,740 | A | 9/1994 | Rather et al. | |
| 5,481,817 | A | 1/1996 | Parker | |
| D382,035 | S * | 8/1997 | Swicegood | D22/108 |
| 5,685,103 | A * | 11/1997 | Wiggins | 42/94 |
| 5,723,808 | A | 3/1998 | Devall | |
| 5,778,589 | A * | 7/1998 | Teague | 42/94 |
| 5,979,099 | A | 11/1999 | Kervin | |

(Continued)

OTHER PUBLICATIONS

Cabelas Master Catalog, Fall 2003, Edition 1.

*Primary Examiner*—Gwendolyn Baxter
(74) *Attorney, Agent, or Firm*—Alan G. Towner, Esq.; Pietragallo, Bosick & Gordon LLP

(57) ABSTRACT

A caddy is provided for supporting a weapon such as a rifle, gun, pistol, cross bow, or long bow while hunting. The caddy serves as an adjustable cradle for supporting the weapon while aiming at a target and a safety device for transporting the weapon. The caddy may be mounted to any suitable support structure such as a tree stand, tree, hunting blind, fence, all terrain vehicle, wheelchair, or the like. In a particular embodiment, two or more caddies may be mounted on a tree stand to safely secure a weapon during set up in a tree. Each caddy may contain a safety device, such as a detachable rubber strap, for securing a weapon. When the safety device is removed, each caddy may be used as a cradle to support a weapon while aiming at a target, and the cradle may be adjusted horizontally, vertically, and/or pivotally.

21 Claims, 4 Drawing Sheets

U.S. PATENT DOCUMENTS

| | | |
|---|---|---|
| 6,244,556 B1 * | 6/2001 | Carrillo .................... 248/519 |
| 6,283,428 B1 | 9/2001 | Maples et al. |
| 6,578,309 B1 | 6/2003 | Frisce |
| 6,588,637 B1 * | 7/2003 | Gates ..................... 224/546 |
| 6,637,708 B1 * | 10/2003 | Peterson ................ 248/285.1 |
| 2001/0001912 A1 | 5/2001 | Weaver |
| 2003/0038150 A1 | 2/2003 | Williams |
| 2003/0038218 A1 | 2/2003 | Eppard et al. |

* cited by examiner

WEAPON CADDY

FIELD OF THE INVENTION

The present invention relates to a weapon caddy for use in hunting from a support structure such as a tree stand, tree, all terrain vehicle, wheelchair, or the like.

BACKGROUND INFORMATION

Tree stands may be installed on trees to provide a seat and hiding place for hunters in search of game. Once the tree stand is installed, it can be dangerous for the hunter to climb into the seat while holding a weapon such as a firearm. Transporting firearms on vehicles, e.g., all terrain vehicles, can also prove to be dangerous.

While aiming at a target, it is often useful for a hunter to support the end of a firearm with a stable guide or cradle. The support can assist the hunter in accurately aiming at a target, especially if the hunter can quickly adjust the support to track the target.

The present invention has been developed in view of the foregoing.

SUMMARY OF THE INVENTION

In accordance with the present invention, a caddy is provided for supporting a weapon such as a rifle, gun, pistol, cross bow, or long bow while hunting. The caddy serves as an adjustable cradle for supporting the weapon while aiming at a target, and may also act as a safety device for transporting the weapon. The caddy may be mounted to any suitable support structure such as a tree stand, tree, hunting blind, fence, all terrain vehicle, wheelchair, or the like. In a particular embodiment, two or more caddies may be mounted on a tree stand to safely secure a weapon during set up in a tree. Each caddy may also be used as a cradle to support a weapon while aiming at a target, and the cradle may be adjusted horizontally, vertically, and/or pivotally with respect to a mounting bracket.

An aspect of the present invention is to provide a weapon caddy that includes a mounting bracket that is structured and arranged for mounting on a support structure, a base member that is slidably mounted on the mounting bracket, and a cradle member that is mounted on the base member and structured and arranged for supporting a weapon.

Another aspect of the present invention is to provide a weapon caddy that includes a mounting bracket structured and arranged for mounting on a support structure, a base member rotatably mounted on the mounting bracket, and a cradle member mounted on the base member and structured and arranged for supporting a weapon.

A further aspect of the present invention is to provide a weapon caddy that includes a mounting bracket structured and arranged for mounting on a support structure, a cradle member mounted on the mounting bracket and structured and arranged for supporting a weapon, and an elastic strap for securing the weapon onto the cradle member.

Another aspect of the present invention is to provide a hunting apparatus comprising a support structure and at least one caddy for supporting a weapon mounted to the support structure. The at least one caddy is movable to a retracted position toward the support structure and an extended position away from the support structure.

These and other aspects of the present invention will be more apparent from the following description.

DETAILED DESCRIPTION

Figure 1:
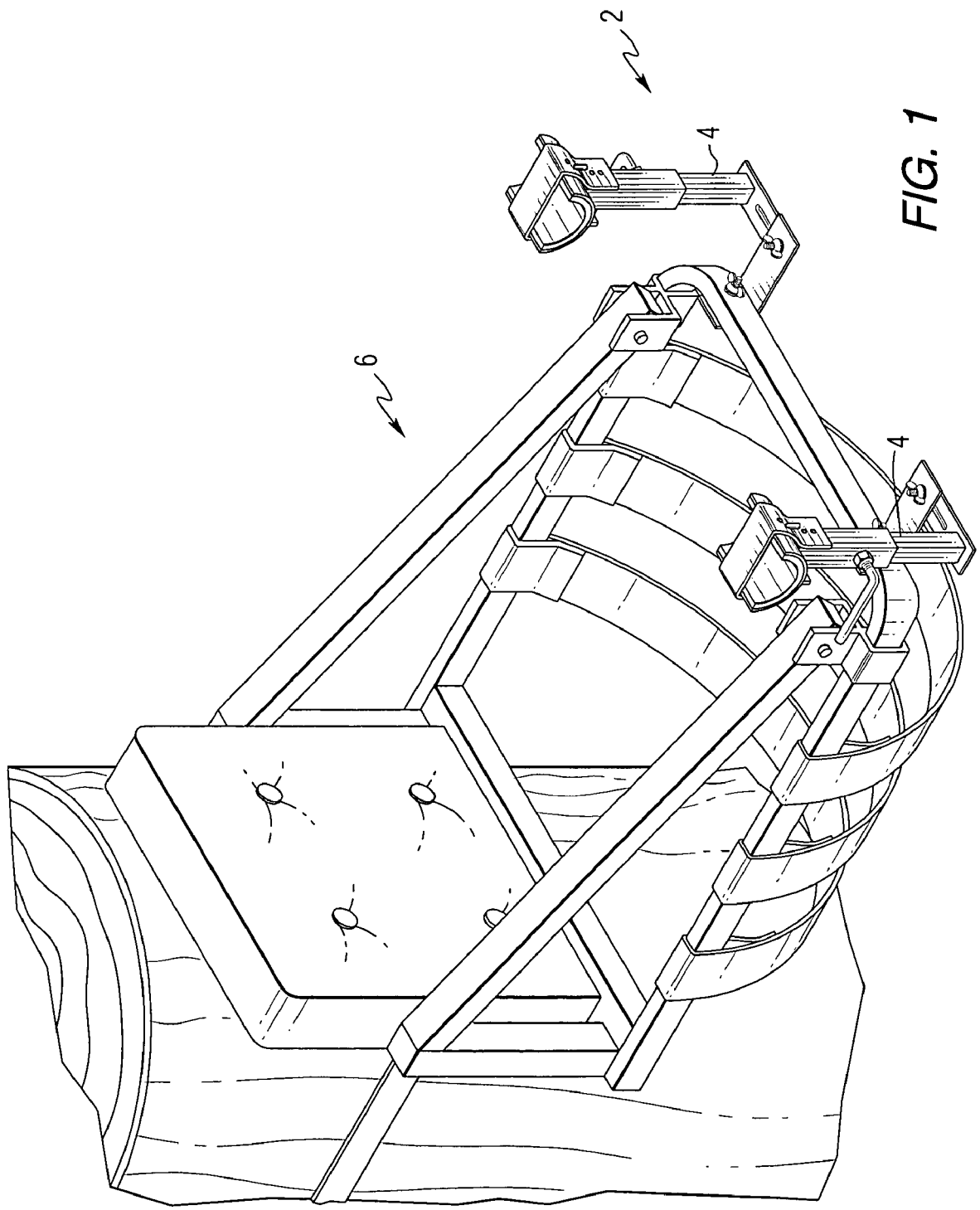
FIG. 1 is an isometric view of multiple weapon caddies mounted to a tree stand in accordance with an embodiment of the present invention.

FIG. 1 presents a hunting apparatus 2 in accordance with an embodiment of the present invention. The hunting apparatus 2 comprises a conventional tree stand 6 with two weapon caddies 8 attached. The weapon caddies 8 may be used to secure a weapon (not shown) in place while the tree stand 6 is being set up. The caddies 8 also pivot to serve as shooting supports while hunting from the tree stand 6. Although FIG. 1 depicts two weapon caddies 8, any number of caddies may be attached to the tree stand 6 or other support structure.

Figure 2:
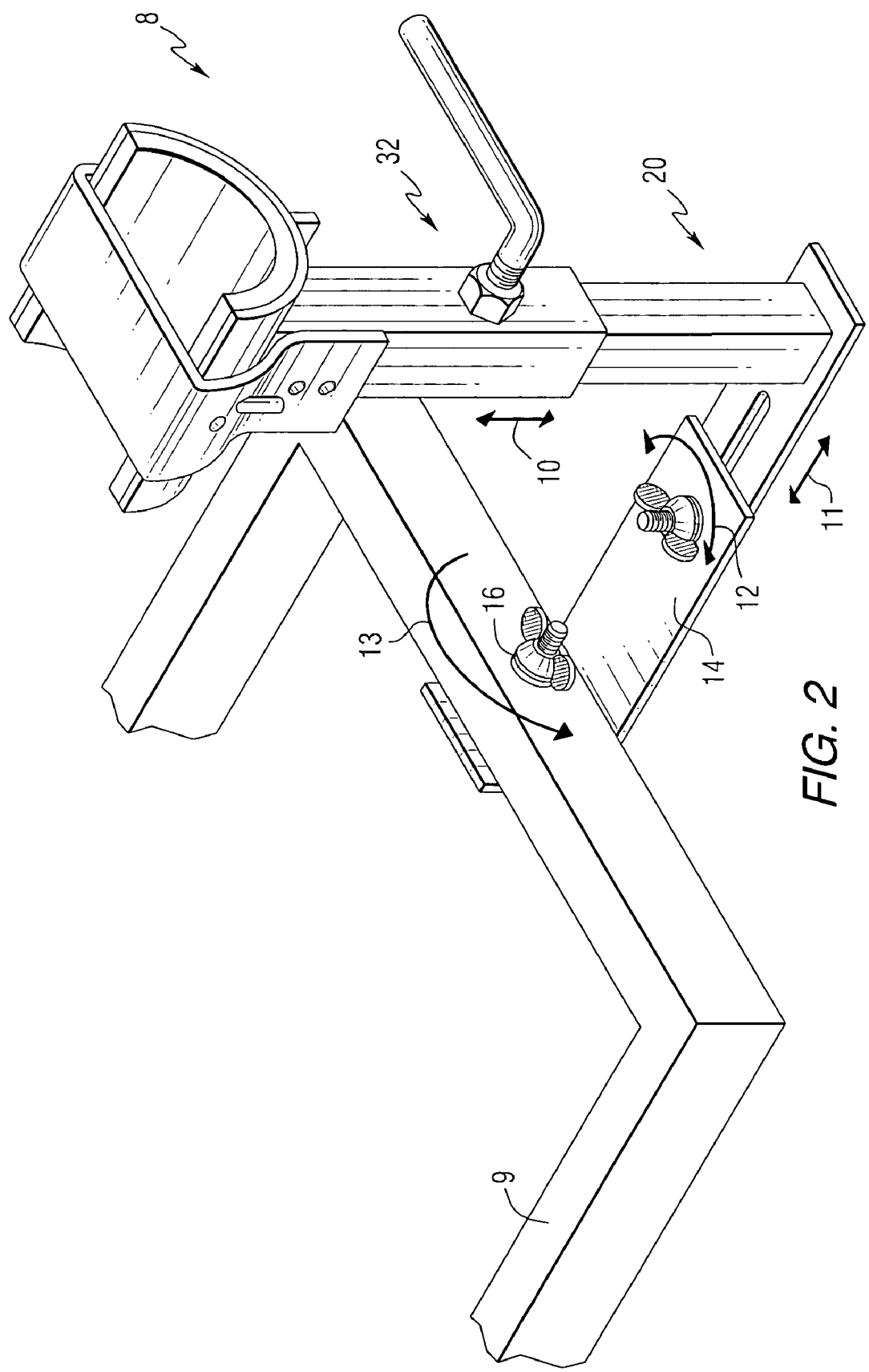
FIG. 2 is an isometric view of a weapon caddy mounted to the front brace of a tree stand in accordance with an embodiment of the present invention.

FIG. 2 illustrates an embodiment of the weapon caddy 8. The weapon caddy 8 is mounted to a front brace 9 of a conventional tree stand, which serves as a support structure. However, the weapon caddy 8 may also be mounted to any other suitable support structure such as a tree, hunting blind, fence, wall, wheelchair, or vehicle. The caddy 8 shown in FIG. 2 is translationally adjustable in a vertical plane 10, translationally adjustable in a horizontal plane 11, and pivotally adjustable in a horizontal plane around a vertical axis 12. The caddy 8 may also be pivotally adjustable in a vertical plane around a horizontal axis 13. The caddy 8 is mounted to the tree stand 9 or support structure using a mounting bracket 14 and mechanical fastener 16 as shown in FIG. 2. The caddy 8 includes a base member 20 and a cradle member 32, as more fully described below. The base member 20 is horizontally slidable 11 between a retracted position adjacent to the mounting bracket 14 and an extended position away from the mounting bracket 14.

Figure 3:
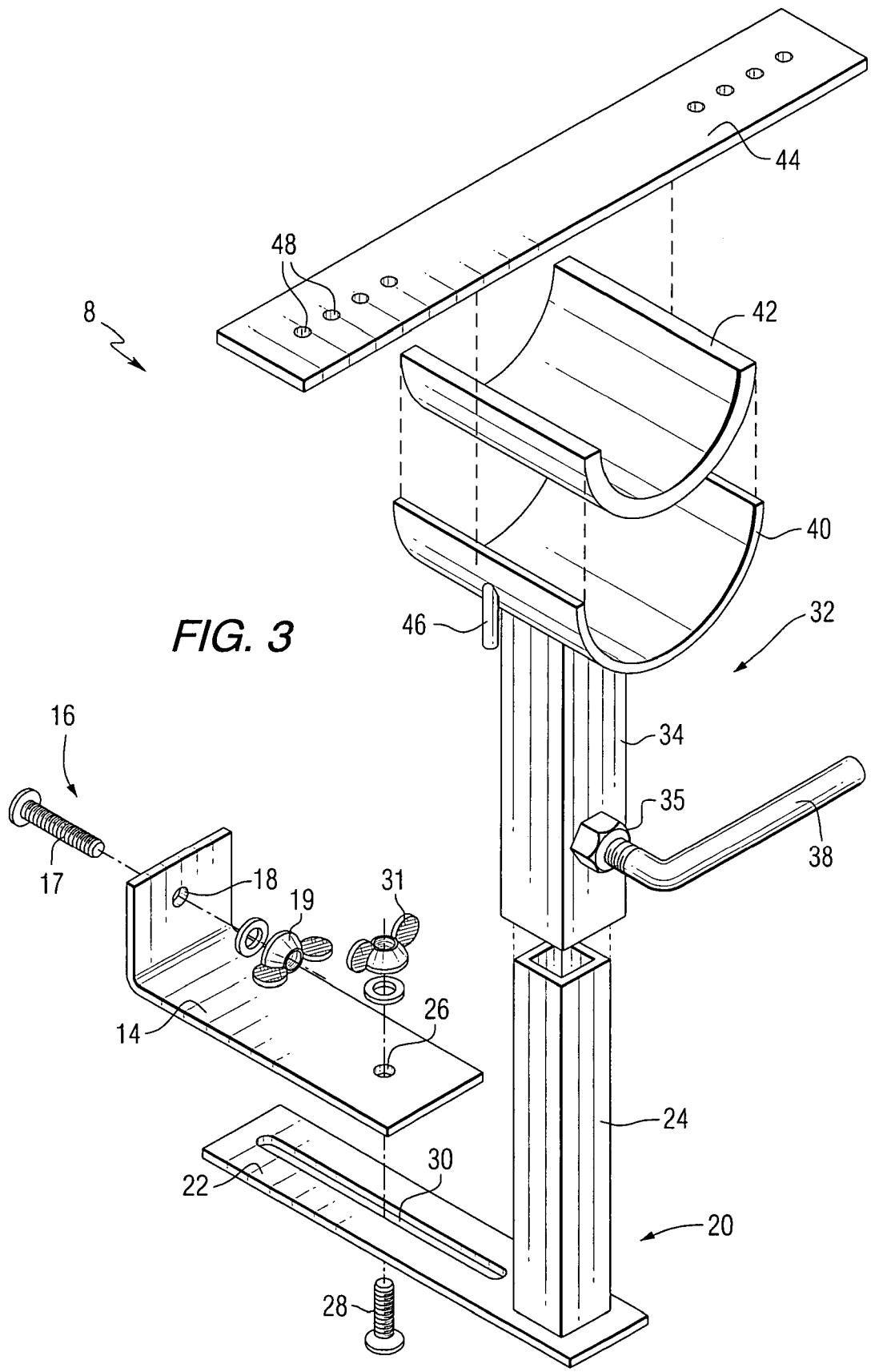
FIG. 3 is an exploded isometric view of the separate components that comprise a weapon caddy in accordance with an embodiment of the present invention.

FIG. 3 illustrates the individual components of the weapon caddy 8. The caddy 8 may be mounted using the mounting bracket 14 and mechanical fastener 16 which comprises a bolt 17 extending through a hole 18 in the mounting bracket 14, and a nut 19 threaded on the bolt 17.

The caddy 8 typically includes a base member 20, which may contain a substantially horizontal section 22 and a substantially vertical section 24. As shown in FIG. 3, the substantially horizontal section 22 and substantially vertical section 24 may be integrally formed or may be welded together or otherwise attached to form a right angle. The horizontal section 22 and vertical section 24 may be made from metal such as steel or aluminum, plastic such as PVC, rubber, or the like, and may have any suitable shapes and dimensions, e.g., circular or rectangular cross-sections.

In the embodiment shown in FIGS. 2 and 3, the entire base member 20 is slidably and rotatably mounted on the mounting bracket 14, which remains stationary with respect to the support structure 9. The base member 20 is considered slidably mounted with respect to the mounting bracket 14 because it may be releasably adjusted to move toward or away from the mounting bracket 14, e.g., in a horizontal plane. In other words, the base member 20 may be slidable between a retracted position adjacent to the mounting bracket 14 and an extended position away from the mounting bracket 14. To achieve this translational movement, the mounting bracket 14 may include an additional hole 26 sized to receive a bolt 28. The substantially horizontal section 22 of the base member 20 may include a linear slot 30 sized to receive the bolt 28 and allow the bolt 28 to slide along the slot 30. A nut 31 threaded on the bolt 28 may be hand tightened to secure the mounting bracket 14 at various sliding positions.

The base member 20 is considered rotatably mounted with respect to the mounting bracket 14 because it may pivot around the mounting bracket 14, e.g., in a horizontal plane. To achieve this horizontal rotation, the caddy 8 may pivot around the bolt 28 that runs through the hole 26 in the mounting bracket 14 and the linear slot 30. The nut 31 threaded on the bolt 28 may be hand tightened to secure the base member 20 at various pivoting positions.

As shown in FIGS. 2 and 3, the cradle member 32 is slidably mounted on the base member 20. The cradle member 32 is releasably adjusted to move towards or away from the base member 20 in a vertical plane. To achieve this vertical translation, the cradle member 32 contains a hollow section 34 that fits over the substantially vertical section 24 of the base member 20, and allows the cradle member 32 to telescope over the vertical section 24.

Figure 4:
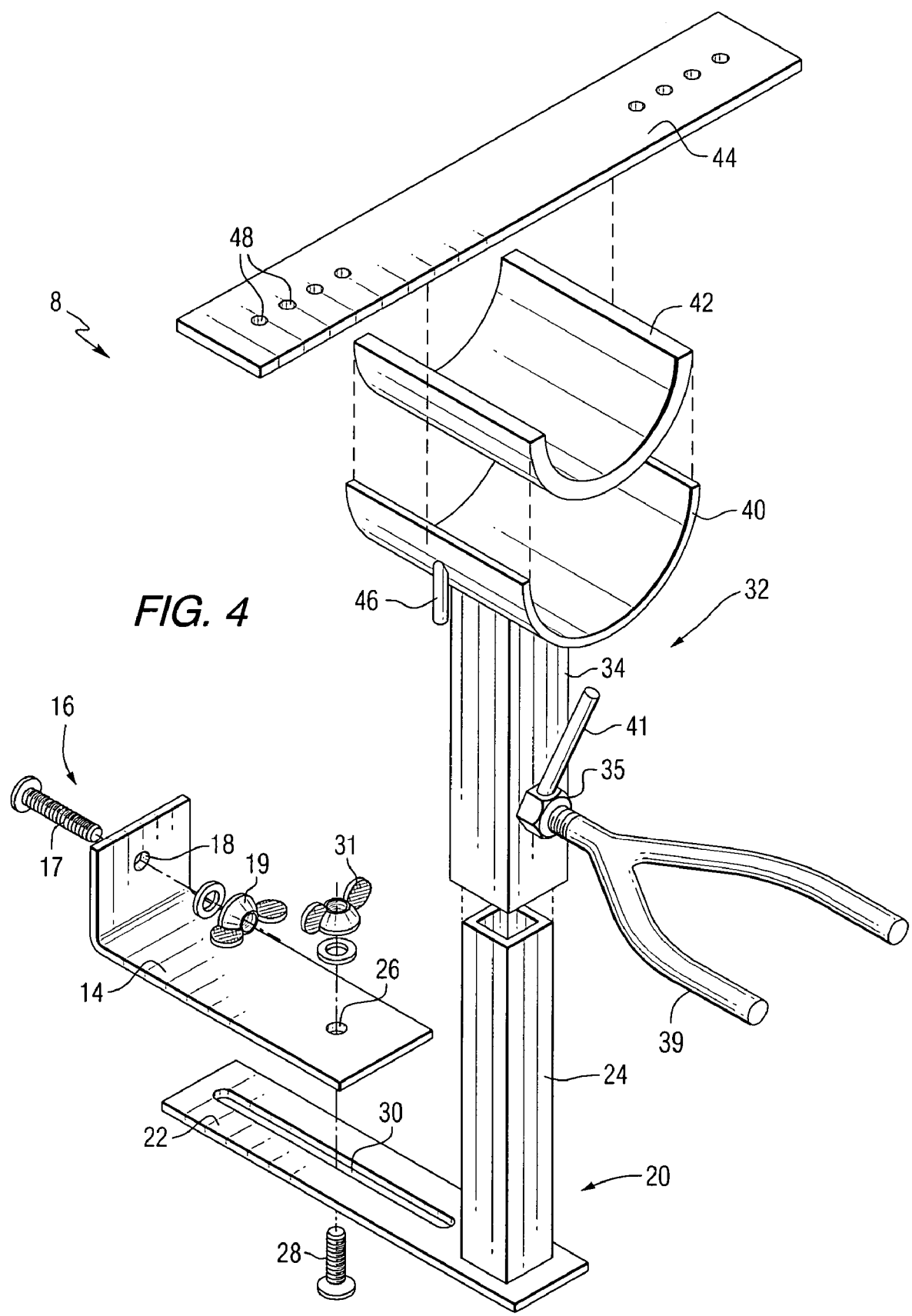
FIG. 4 is an exploded isometric view of the weapon caddy, including an additional pronged support, in accordance with an embodiment of the present invention.

The telescoping hollow section 34 of the cradle member 32 has a nut 35 welded thereto, with the center hole of the nut aligned with a hole through the wall of the hollow section 34. The holes are sized to receive a threaded handle 38 for tightening the hollow section 34 against the vertical section 24 of the base member 20. When the handle 38 is tightened, the cradle member 32 may be secured against the vertical section 24 of the base member 20 at various sliding positions. Instead of a threaded handle 38, any other suitable fastening device may be used for securing the cradle member 32 to the vertical section 24 at various sliding positions. The fastening device may also include an additional support to assist in aiming or positioning a long bow or other weapon in a vertical rest position. For example, the fastening device may comprise a threaded member with prongs 39 and a tightening handle attached to a nut 41, as shown in FIG. 4. The prongs 39 may be used as an additional support for a long bow, and may be fitted with a rubber or elastic liner.

The cradle member 32 includes a cradle or holder 40 attached to the hollow section 34 that is preferably lined with a rubber insert 42 or other resilient material for cushioning the weapon. The cradle 40 may have a U shape as shown in FIG. 3, or any other suitable shape that will hold a weapon, such as a V shape. The hollow section 34 and the cradle 40 of the cradle member 32 may be made from any suitable material such as steel, aluminum, plastic, PVC, rubber, or the like. The cradle member 32 may also include a safety device for securing the weapon onto the cradle 40. In a preferred embodiment, the safety device may comprise a detachable strap 44 made from a resilient material like rubber.

To secure the strap 44, the cradle member 32 may contain one or more pegs 46 that protrude from its surface, and the strap 44 may contain one or more holes 48 sized to engage the pegs 46. The pegs 46 may be used to secure the strap 44 when it is stretched across the cradle 40 and a weapon, while still allowing the strap 44 to be quickly removed from the caddy 8 to use the cradle 40 as a shooting support. In a preferred embodiment, at least two pegs 46 are positioned to downwardly protrude from the cradle 40. The strap 44 preferably has an elongated rectangular shape of sufficient length to traverse a conventional hunting weapon such as a rifle, gun, pistol, cross bow, or long bow while it is resting against the cradle 40. In addition, the strap 44 preferably contains a sufficient number of holes 48 to secure it across conventional weapons of varying size.

In accordance with the present invention, the caddy 8 is provided for supporting a weapon such as a rifle, gun, pistol, cross bow, or long bow while hunting. The caddy serves as an adjustable cradle for supporting the weapon while aiming at a target, and may also serve as a safety device for transporting the weapon. In a preferred embodiment, two or more caddies are mounted to a tree stand to safely secure a weapon while installing the stand in a tree and climbing into the stand. Although primarily described herein as being mounted to a tree stand, the caddy may also be mounted to, or used in association with, other types of hunting apparatus. For example, the caddy may be mounted to other stationary structures such as trees, hunting blinds, fences, walls, wheelchairs, and other forms of natural habitation, as well as vehicles such as all terrain vehicles, trucks, and cars.

The caddy may include a mounting bracket, a base member that is slidable and rotatable with respect to the mounting bracket, and a telescoping cradle member that is slidable with respect to the base member. The caddy may also include a safety device that secures a weapon on the cradle member while the weapon is being transported. In addition, the safety device may be removed to use the cradle member as a shooting support. In a preferred embodiment, the cradle member has a U-shaped cradle or holder to support a weapon, although the cradle may also have a V shape or any other suitable shape capable of supporting the weapon. In addition, the cradle may have a liner made from an elastic, resilient material like rubber, or any other suitable material capable of cushioning the weapon against the holder.

In a preferred embodiment, the safety device comprises a detachable strap made from an elastic, resilient material like rubber. To secure the strap across the cradle and weapon, the cradle may contain pegs and the strap may contain holes for engaging those pegs. However, any other suitable safety device may be used to secure the weapon onto the cradle in accordance with the present invention. For example, the safety device may include a plastic strap, a fabric strap, Velcro, or string instead of a rubber strap, or a buckling, clamping, or tying component instead of a peg.

When the safety device is removed, the cradle may be adjusted for use as a weapon support while aiming at targets. The cradle may translate with respect to the mounting bracket, e.g., in either a horizontal or vertical plane, or pivotally rotate around the mounting bracket, e.g., in a horizontal plane. The caddy may also be designed to pivot around the support structure in a vertical plane. In a preferred embodiment, the caddy is adjusted using fastening devices, such as nut and bolt assemblies, that may be quickly tightened or loosened by hand. However, the cradle may also be adjusted using frictional, mechanical, electrical, magnetic, or clamping components.

Translational movement in the vertical and horizontal direction is important because it allows the hunter to adjust the caddy according to his size and preferences, the style of his weapon, and the type of support structure he is using. This translational movement, combined with rotational movement, makes the caddy adaptable to a wide range of hunting situations, and allows for conversion of the caddy from a weapon safety support to an adjustable shooting guide. In addition, rotational movement is important because it allows the hunter to swivel the caddy and track moving game.

The caddy may be secured onto a structure, e.g., a tree stand, using a mounting device that attaches to the mounting bracket. Suitable mounting devices include, but are not limited to, nut and bolt assemblies, clamps, magnets, pins, adhesives, welding, and wood tapping devices.

Whereas particular embodiments of this invention have been described above for purposes of illustration, it will be evident to those skilled in the art that numerous variations of the details of the present invention may be made without departing from the invention.

What is claimed is:

1. A caddy for supporting a weapon, the caddy comprising:
    a mounting bracket structured and arranged for mounting on a support structure;
    a base member slidably mounted on the mounting bracket;
    a coupling between the mounting bracket and the base member which permits both sliding and rotating movement between the mounting bracket and base member at a single point of connection between the mounting bracket and base member, wherein the base member slides and rotates in a substantially horizontal plane; and
    a cradle member slidably mounted on the base member and structured and arranged for supporting the weapon.

2. The caddy of claim 1, wherein the coupling comprises a bolt extending through the mounting bracket and a slot in the base member in which the bolt is slidable, wherein the base member is pivotable around the bolt.

3. The caddy of claim 1, wherein the cradle member is slidable in a substantially vertical direction when the mounting bracket is mounted on the support structure.

4. The caddy of claim 1, wherein the cradle member contains a hollow section that slides over a substantially vertical section of the base member and allows the cradle member to telescope on the substantially vertical section of the base member.

5. The caddy of claim 1, wherein the cradle member is generally U-shaped.

6. The caddy of claim 1, wherein the cradle member comprises an elastic liner.

7. The caddy of claim 1, further comprising a strap on the cradle member for securing the weapon.

8. The caddy of claim 7, wherein the strap is detachable.

9. The caddy of claim 7, wherein the strap comprises an elastic material.

10. The caddy of claim 7, wherein the strap comprises holes for receiving pegs extending from the cradle member.

11. The caddy of claim 1, further comprising a mechanical fastener for mounting the mounting bracket onto the support structure.

12. The caddy of claim 1, wherein the support structure comprises a tree stand.

13. A hunting apparatus comprising:
    a support structure; and
    at least two caddies for supporting a weapon mounted on the support structure, wherein at least one of the caddies comprises:
    a mounting bracket structured and arranged for mounting on a support structure;
    a base member slidably mounted on the mounting bracket;
    a coupling between the mounting bracket and the base member which permits both sliding and rotating movement between the mounting bracket and base member at a single point of connection between the mounting bracket and the base member, wherein the base member slides and rotates in a substantially horizontal plane; and
    a cradle member slidably mounted on the base member and structured and arranged for supporting the weapon.

14. The hunting apparatus of claim 13, wherein the support structure comprises a tree stand.

15. The hunting apparatus of claim 14, further comprising a mechanical fastener for mounting the mounting bracket onto the support structure.

16. The hunting apparatus of claim 15, wherein the mechanical fastener comprises a bolt extending through a hole in the mounting bracket and a nut threaded on the bolt.

17. The hunting apparatus of claim 13, wherein the mounting bracket is welded on the support structure.

18. The hunting apparatus of claim 13, wherein the mounting bracket is rotatably mounted on the support structure.

19. The hunting apparatus of claim 13, further comprising an elastic strap on the cradle member for securing the weapon.

20. A caddy for supporting a weapon, the caddy comprising:
    a mounting bracket structured and arranged for mounting on a support structure;
    a base member slidably mounted on the mounting bracket;
    a coupling between the mounting bracket and the base member which permits both sliding and rotating movement between the mounting bracket and base member at a single point of connection between the mounting bracket and base member, wherein the base member slides and rotates in a substantially horizontal plane, the coupling comprises a bolt extending through the mounting bracket and a slot in the base member in which the bolt is slidable, and the base member is pivotable around the bolt; and
    a cradle member mounted on the base member and structured and arranged for supporting the weapon.

21. A hunting apparatus comprising:
    a support structure; and
    at least two caddies for supporting a weapon mounted on the support structure, wherein at least one of the caddies comprises:
    a mounting bracket welded on the support structure;
    a base member slidably mounted on the mounting bracket;
    a coupling between the mounting bracket and the base member which permits both sliding and rotating movement between the mounting bracket and base member at a single point of connection between the mounting bracket and the base member, wherein the base member slides and rotates in a substantially horizontal plane; and
    a cradle member mounted on the base member and structured and arranged for supporting the weapon.

* * * * *